D. MOYER.
Seed-Planter.
No, 28.595. Patented June 5, 1860.
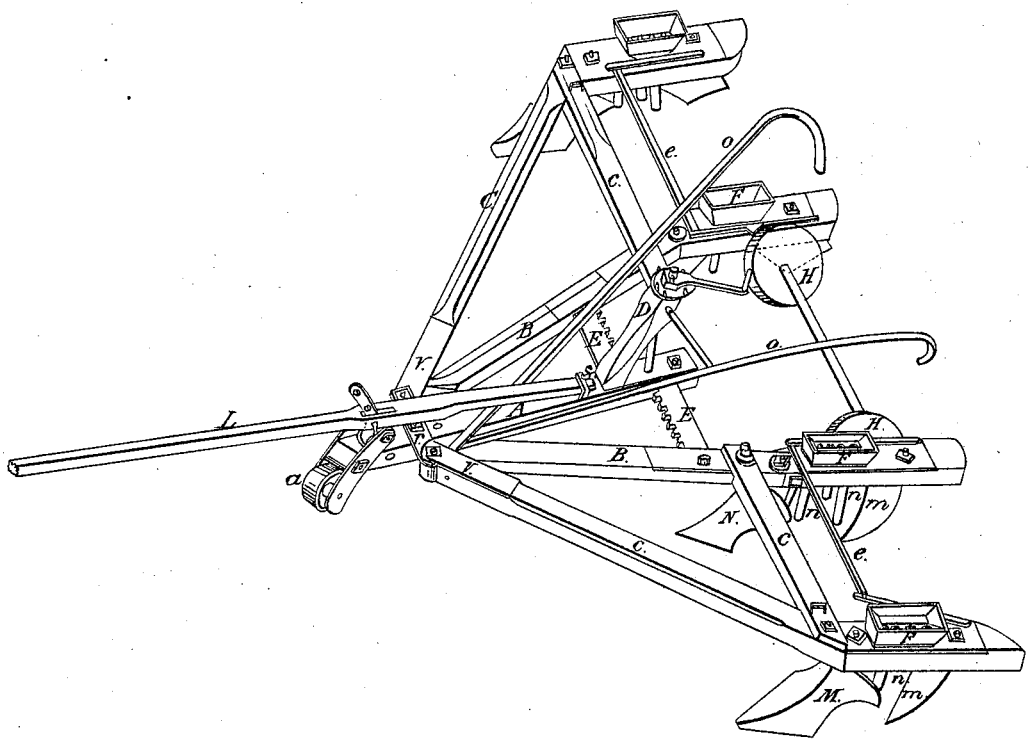

UNITED STATES PATENT OFFICE.

DANIEL MOYER, OF NEW HAMBURG, PENNSYLVANIA.

IMPROVEMENT IN CORN-PLANTERS.

Specification forming part of Letters Patent No. 28,595, dated June 5, 1860.

*To all whom it may concern:*

Be it known that I, DANIEL MOYER, of New Hamburg, in the county of Mercer and State of Pennsylvania, have invented a new and useful Machine for Planting Corn, of which the following is a full, clear, and exact description, reference being had to the annexed drawing, making a part of the same, in which—

A represents the center beam, to which all the other parts of the machine, including motive power, and the handles O O, by which the machine is guided, are attached.

The wheel $a$ regulates the depth of the plows, and may be set to suit the nature of the ground or the wishes of the operator by elevating or lowering the clevis in the regulator, or by placing the pin 1 through the beam A at the hole $w$, the regulator being lowered to that point.

The arms B B and C C are attached to the center beam by screw-bolts 2 2 passing through the iron plates $v$ and $r$ and the brace $g$ $g$. The staple S receives the end of the tongue L. The connecting-bars $c$ $c$ keep the arm B and C permanently in their places. These are fastened at each end by screw-bolts 3, and may be taken off at pleasure when it is desirable to use the machine for planting two instead of four rows, or for other purposes, as shown hereinafter. They also stay and support the plows M and N and the mold-boards or shovels $m$. The plows M and N furrow out or mark the ground, and the mold-board or shovel $m$, following immediately after the tubes $n$, cover the corn with earth to the depth of two inches, (more or less, as desired,) while neither clods nor stones are left on the seeds.

The connecting-rods $e$, in connection with the slides $i$ and the wheels H, regulate the dropping of the seed from the hoppers F through the tubes $n$. Each revolution of the wheels H causes the seed to drop in hills three feet apart, or in proportion, according to the size of the wheels, when there is but one cog attached to the side of each wheel. If it is desired to plant the hills closer, two cogs may be placed to the sides of the wheels, (each wheel,) as shown in the drawing, which will diminish the distance fifty per cent. The slides acting alike on all the planters at the same time, the seeds are dropped from each hopper at the same moment.

By drawing a furrow along each end of the field to indicate the starting-point the machine can be used for planting both in going through the field and returning, and yet so as to make the rows all through the field cross at right angles, so that the corn may be plowed either way. The position of the machine at the starting-point may be regulated by means of the lever J.

The plow-beams are strengthened by iron plates. The hoppers containing the seed-corn are placed in the beams, immediately behind the plows and just before the shovel or mold-board which covers the seeds in the hill. The tubes extend from the bottom of the hoppers and are four in number in each hopper. If it is desired to plant less number of grains than four to a hill, the number can be reduced by plugging some of the tubes.

The plows are metal with steel points, or may be wholly of metal or of steel. The beams, &c., are wood. The wheels may be of wood or metal.

The pointer P, with the arm or tail attached to it, marks the place of the last row, and regulates the distance, and is so adjusted by pins and staples T on the cross-bars C C that it may be used on either side without difficulty or loss of time.

The post D supports the handles O O, and also the shaft $b$, which is connected with wheel 7 and crank I, and by means of same wheel the bars with cogs E E are regulated, and distance between the plows N is either extended or contracted.

If the ground is too uneven, rough, or stony to admit of planting four rows at one time, the plows M and the shovel or mold-board connected with them may be removed by taking out the screw-bolts 3 and 2 and the slide-pins 4, and taking off the arms C and the rods $e$, and placing on cross-bar K, which is to be placed between the arms B and secured at the ends by bolts 3. The machine is then left perfect and complete with but two planters. The tongue L is secured in its place by a pin and staple, S, and is intended for two horses when the machine is used for planting. It can be taken out when used for cultivating and but one horse attached. After planting is over and the corn requires to be worked the same machine may be used instead of an ordinary cultivator or corn-plow by removing the bolts 5 and attaching one of the plows M to the beam A (the machine having been before reduced to two) at the hole Q, and removing the regulator in connection with the wheel $a$ by taking out bolt 6, or by simply taking out bolt 1 and leaving the wheel $a$ and regulator, and you have a perfect cultivator.

The plows N may be regulated by means of the crank I without stopping, so as to either throw the earth close up to the corn or otherwise, at the pleasure of the operator, as a few turns of the crank one way or the other will either extend or contract to any required distance. As the crank I moves the shaft $b$, the lower end of which is connected with wheel 7, the cogs of which fitting closely into those of the bars E, the space is equally increased or diminished on each side at the same time and by the same motion. The cogs on wheel 8 are for the purpose of keeping the crank I in its place when not used.

By leaving the plows N as in the drawing the earth will be thrown toward the hill. By changing their position from one to the other it will throw it from the rows. This, too, can be easily arranged to meet the wishes of those using the machine.

What I claim as my invention, and desire to secure by Letters Patent, is—

The arrangement of the center beam, A, wheel $a$, arms B B and C C, plates $v\ v$ and $r$, the brace $g$, bars $c\ c$, hoppers F, plows M and N, mold-boards or shovels $m$, tubes $n$, connecting-rods $e$, slides $i$, and wheels H, as described, for the purposes specified.

DANIEL MOYER.

Attest:
JOHNSON PENYER,
A. H. SNYDER.